(12) United States Patent
Vitalis et al.

(10) Patent No.: US 9,363,562 B1
(45) Date of Patent: Jun. 7, 2016

(54) METHOD AND SYSTEM FOR AUTHORIZING A USER DEVICE

(71) Applicant: STINGRAY DIGITAL GROUP INC., Montreal (CA)

(72) Inventors: Laurent Vitalis, Saint-Lambert (CA); Philippe Cote, Montreal (CA)

(73) Assignee: STINGRAY DIGITAL GROUP INC., Montreal (CA)

( * ) Notice: Subject to any disclaimer, the term of this patent is extended or adjusted under 35 U.S.C. 154(b) by 35 days.

(21) Appl. No.: 14/556,480

(22) Filed: Dec. 1, 2014

(51) Int. Cl.
| | |
|---|---|
| *H04N 21/43* | (2011.01) |
| *H04N 21/4627* | (2011.01) |
| *H04N 21/8358* | (2011.01) |
| *H04N 21/439* | (2011.01) |
| *H04N 21/41* | (2011.01) |
| *H04N 19/167* | (2014.01) |
| *H04N 19/46* | (2014.01) |
| *H04N 21/258* | (2011.01) |

(52) U.S. Cl.
CPC ......... *H04N 21/4627* (2013.01); *H04N 19/167* (2014.11); *H04N 19/46* (2014.11); *H04N 21/25816* (2013.01); *H04N 21/25875* (2013.01); *H04N 21/4104* (2013.01); *H04N 21/4307* (2013.01); *H04N 21/4394* (2013.01); *H04N 21/8358* (2013.01)

(58) Field of Classification Search
CPC .................. H04N 21/25816; H04N 21/25875; H04N 21/4307; H04N 19/46; H04N 19/167
See application file for complete search history.

(56) References Cited

U.S. PATENT DOCUMENTS

| | | | |
|---|---|---|---|
| 6,625,642 B1 * | 9/2003 | Naylor | H04L 12/58 358/1.15 |
| 7,516,074 B2 | 4/2009 | Bilobrov | |
| 7,783,489 B2 | 8/2010 | Kenyon et al. | |
| 8,036,418 B2 | 10/2011 | Meyer et al. | |
| 8,332,478 B2 | 12/2012 | Levy et al. | |
| 8,671,165 B2 | 3/2014 | Davis | |
| 8,694,533 B2 | 4/2014 | Oztaskent et al. | |

(Continued)

FOREIGN PATENT DOCUMENTS

WO 03/091899 11/2003

OTHER PUBLICATIONS

Trice, A., "Connected Second-Screen App Experiences with PhoneGap & Audio Watermarks," [online] [retrieved on Oct. 14, 2014]. Retrieved from the Internet:< URL: http://www.tricedesigns.com/2012/12/12/connected-second-screen-app-experiences-with-phonegap-audio-watermarks/>.

(Continued)

*Primary Examiner* — Robert Hance
(74) *Attorney, Agent, or Firm* — McDonnell Boehnen Hulbert & Berghoff LLP (57) ABSTRACT

There is described a computer-implemented method for authorizing a user device, comprising: use of a processor for receiving an extracted identifier transmitted by a secondary device to be authorized over a telecommunication network, the extracted identifier being previously extracted by the secondary device to be authorized from an acoustic signal generated by an authorized main device, the acoustic signal corresponding to a transmitted audio signal received by the authorized main device and having a reference identifier embedded therein; use of the processor for validating the received identifier; and upon successful validation, use of the processor for transmitting an authorization confirmation to the secondary device.

26 Claims, 3 Drawing Sheets

(56) References Cited

U.S. PATENT DOCUMENTS

| | | |
|---|---|---|
| 8,700,407 B2 | 4/2014 | Wang et al. |
| 8,739,208 B2 | 5/2014 | Davis et al. |
| 8,816,179 B2 | 8/2014 | Wang |
| 9,106,975 B1 * | 8/2015 | Gildfind ............... H04N 21/812 |
| 9,219,790 B1 * | 12/2015 | Filev ....................... H04L 67/22 |
| 2006/0206582 A1 | 9/2006 | Finn |
| 2010/0119208 A1 | 5/2010 | Davis et al. |
| 2011/0188704 A1 * | 8/2011 | Radhakrishnan .... H04N 17/004 382/100 |
| 2011/0289532 A1 * | 11/2011 | Yu ....................... H04N 21/4126 725/38 |
| 2013/0111514 A1 * | 5/2013 | Slavin ..................... H04H 60/64 725/18 |
| 2013/0130714 A1 * | 5/2013 | Huibers ................. H04W 24/00 455/456.1 |
| 2013/0265857 A1 * | 10/2013 | Foulds ................... G08C 23/02 367/199 |
| 2014/0012572 A1 | 1/2014 | Herberger et al. |
| 2014/0037132 A1 * | 2/2014 | Heen ..................... G06T 1/0021 382/100 |
| 2014/0089815 A1 | 3/2014 | Gildfind et al. |
| 2014/0098177 A1 | 4/2014 | Morsy et al. |
| 2014/0129232 A1 * | 5/2014 | Jones ..................... G06Q 40/12 704/275 |
| 2014/0134941 A1 | 5/2014 | Anniballi et al. |
| 2014/0137209 A1 * | 5/2014 | Eonnet .................... G06F 21/35 726/4 |
| 2014/0245339 A1 * | 8/2014 | Zhang ................ H04N 21/8358 725/18 |
| 2016/0050457 A1 * | 2/2016 | Mondal ............ H04N 21/44204 725/18 |

OTHER PUBLICATIONS

Sigg, Stephan, et al., "AdhocPairing: Spontaneous audio based secure device pairing for Android mobile devices," Fourth International Workshop on Security and Privacy in Spontaneous Interaction and Mobile Phone Use (IWSSII SPMU), 2012.

* cited by examiner

METHOD AND SYSTEM FOR AUTHORIZING A USER DEVICE

CROSS-REFERENCE TO RELATED APPLICATIONS

This is the first application filed for the present invention.

TECHNICAL FIELD

The present invention relates to the field of methods and systems for authorizing devices, and more particularly authorization methods and systems using an acoustic signal.

BACKGROUND

Media content companies such as TV channels or radio stations always try to offer new services to their customers in order to retain their customers. For example, TV channels may offer mobile content to customers of a broadcast company that broadcasts the content of the TV channel. In order to provide the broadcast company customers with an access to the mobile content, the customers must receive an access code from the TV channel in order to authorize a given mobile device of a customer to access the mobile content. The access code may be sent via email to the customers. However, sending emails to each customer may be cumbersome and time-consuming for the TV channel. Furthermore, the customer has to access the email in which the code access is contained, copy the access code, and enter the access code into the mobile application that will allow him to access the mobile content. This method for a user to access the mobile content is time-consuming and may prevent some customers from accessing the mobile content offered by the TV channel. The customer might also need to create a username and password with the TV broadcaster in order to access the mobile content. Such credentials are often forgotten or unknown to the customer and as such the advantage of broader usage of the mobile application is limited Therefore, there is a need for an improved method for authorizing a user device.

SUMMARY

There is described a method for authorizing a user device using the audio signal contained in a media content transmitted to a main separate device. Once authorized, the user device may have access to resources or content accessible over a telecommunication network. A reference identifier is embedded in the audio signal. The reference identifier depends on the media content itself and/or a scheduled playback time associated with the media content. A media content comprising the reference identifier is transmitted to the main device. The audio signal having the reference identifier is played back the main device, thereby generating an acoustic signal. The user device to be authorized acquires the acoustic signal for a predefined period of time, and extracts the identifier embedded therein. The predefined period of time is chosen to ensure that the whole reference identifier will be present in the acquired portion of acoustic signal. The user device then transmits the extracted identifier to an authorization server. The authorization server retrieves the reference identifier that corresponds to the actual playback time of the media content and compares the extracted and received identifier to the retrieved reference identifier. Upon successful comparison, the authorization server transmits an authorization confirmation to the user device.

In accordance with a first broad aspect, there is provided a computer-implemented method for authorizing a user device, comprising: use of a processor for receiving an extracted identifier transmitted by a secondary device to be authorized over a telecommunication network, the extracted identifier being previously extracted by the secondary device to be authorized from an acoustic signal generated by an authorized main device, the acoustic signal corresponding to a transmitted audio signal received by the authorized main device and having a reference identifier embedded therein; use of the processor for validating the received identifier; and upon successful validation, use of the processor for transmitting an authorization confirmation to the secondary device, thereby authorizing the secondary device to access media content.

In one embodiment, the reference identifier is generated as a function of a scheduled playback time associated with the audio signal, the scheduled playback time corresponding to a given time at which the audio signal is scheduled to be one of: played back by the authorized main device; and transmitted to the main device.

In another embodiment, the reference identifier is generated as a function an identification of a media content that contains the audio signal.

In one embodiment, the reference identifier is further generated as a function of an identification of the authorized main device.

In one embodiment, the reference identifier comprises an audio watermark.

In one embodiment, the audio signal is one of streamed and broadcasted, the authorized main device for playing back the audio signal as the authorized main device receives the audio signal.

In another embodiment, the audio signal is transmitted to the authorized main device as a whole at a discrete point in time, the authorized main device being adapted to further receive a scheduled playback time indicating a time at which the audio signal is scheduled to be played back by the authorized main device.

In one embodiment, the step of validating comprises: determining an actual playback time for the audio signal; retrieving a given reference identifier for which a scheduled playback time substantially corresponds to the actual playback time; comparing the extracted identifier to the given reference identifier, a positive match between the extracted identifier and the given reference identifier corresponding to a successful validation.

In one embodiment, the actual playback time substantially corresponds to one of: a first time at which the extracted identifier is received; a second time at which the extracted identifier is extracted by the secondary device; and a third time at which the extracted identifier is transmitted by the secondary device.

In another embodiment, the step of validating comprises: determining a first identification of an actual audio signal being actually streamed or broadcasted; determining a second identification of the audio signal corresponding to the extracted identifier; and comparing the first and second identification, a positive match corresponding to a successful validation.

In one embodiment, the audio signal corresponds to an audio track of a video.

In one embodiment, the authorization message comprises a security code to be used to access resources.

In accordance with a second broad aspect, there is provided an apparatus for authorizing a user device, the apparatus comprising a processing unit, a communication unit, and a memory having stored thereon instructions that when executed by the processing unit performs the steps of the above method for authorizing a user device.

In accordance with another broad aspect, there is provided a computer-implemented method for a user device to request for an authorization, comprising: use of a processor for acquiring an acoustic signal having a reference identifier embedded therein, thereby obtaining an acquired audio signal having the reference identifier embedded therein, the acoustic signal being generated by an authorized device, the acoustic signal corresponding to a transmitted audio signal received by the authorized device and having the identifier embedded therein; use of the processor for extracting the reference identifier from the acquired audio signal, thereby obtaining an extracted identifier; use of the processor for transmitting the extracted identifier to an authorization server over a telecommunication network; and use of the processor for receiving from the authorization server an authorization confirmation upon successful validation of the extracted identifier from the authorization server.

In one embodiment, the reference identifier depends on a scheduled playback time associated with the audio signal, the scheduled playback time corresponding to a given time at which the audio signal is scheduled to be one of: played back by the authorized main device; and transmitted to the main device.

In the same or another embodiment, wherein the reference identifier is generated as a function an identification of a media content that contains the audio signal.

In one embodiment, the reference identifier is further generated as a function of an identification of the authorized main device.

In one embodiment, the reference identifier comprises an audio watermark.

In one embodiment, the audio signal is one of streamed and broadcasted, the authorized main device for playing back the audio signal as the authorized main device receives the audio signal.

In another embodiment, the audio signal is transmitted to the authorized main device as a whole at a discrete point in time, the authorized main device being adapted to further receive a scheduled playback time indicating a time at which the audio signal is scheduled to be played back by the authorized main device.

In one embodiment, the validation comprises: determining an actual playback time for the audio signal; retrieving a given reference identifier for which a scheduled playback time substantially corresponds to the actual playback time; comparing the extracted identifier to the given reference identifier, a positive match between the extracted identifier and the given reference identifier corresponding to a successful validation.

In one embodiment, the actual playback time substantially corresponds to one of: a first time at which the extracted identifier is received; a second time at which the extracted identifier is extracted by the secondary device; and a third time at which the extracted identifier is transmitted by the secondary device.

In another embodiment, the validation comprises: determining a first identification of an actual audio signal being actually streamed or broadcasted; determining a second identification of the audio signal corresponding to the extracted identifier; and comparing the first and second identification, a positive match corresponding to a successful validation.

In one embodiment, the audio signal corresponds to an audio track of a video.

In one embodiment, the authorization message comprises a security code to be used to access resources.

In accordance with a further broad aspect, there is provided an apparatus to be authorized, the apparatus comprising a processing unit, a communication unit, and a memory having stored thereon instructions that when executed by the processing unit performs the steps of the above method.

It should be understood that the term "broadcasting" refers to the distribution of audio and/or video content to a dispersed audience via any mass communications medium such as radio systems or TV broadcast systems.

It should be understood that the term streaming refers to a method of transmitting or receiving data over a telecommunication network such as a computer network as a steady, continuous flow, allowing playback to proceed while subsequent data is being received.

The expression "audio signal" refers to an electrical signal representative of sound. An audio signal may be analog or digital. The expression "acoustic signal" or "acoustic wave" refers a mechanical wave such as sound that propagates in gases such as air, liquids, and/or solids. An acoustic signal may representative of an audio signal. In this case, the acoustic signal may correspond to the mechanical wave representation of the audio signal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

There is described a method and system for authorizing a user device using an audio signal. A main device is already authenticated, authorized, and/or registered to receive media content. The media content contains a reference identifier that is previously embedded in an audio signal/track contained in the media content. The reference identifier may be generated as a function of the media content in which it is to be embedded, i.e. as a function of an identification of the media content, and/or a scheduled playback time for the media content. The audio signal/track is played back by the main device, thereby generating an acoustic signal in which the reference identifier is also embedded, and the acoustic signal is acquired by the user device to be authorized which extracts the identifier from the acquired acoustic signal and transmits the extracted identifier to an authorization server. The authorization server compares the extracted identifier received from the user device to be authorized to a reference identifier that corresponds to an actual playback time. Upon successful matching between the extracted identifier and the reference identifier, the authorization server transmits a confirmation of authorization to the user device, thereby confirming that the user device is now authorized to access given resources or content.

In one embodiment, all data representative of the media content to be played back by the main device is sent concurrently at a discrete point in time. The scheduled playback time associated with the media content is also sent at a discrete point in time to the main device. In one embodiment, the scheduled playback time and the media content may be concurrently sent to the main device. In another embodiment, the media content may be first sent to the main device, and the scheduled playback time may be sent to the main device subsequently to the transmission of the media content, or vice-versa.

For example, the media content containing the reference identifier may be sent as a computer file to the main device over a telecommunication network such as a computer network or a wireless telecommunication network. The file may further contain the scheduled playback time associated with the media content. In this case, the main device is adapted to play back the received media content at the time/date indicated by the scheduled playback time.

In another embodiment, the media content is transmitted via streaming over the Internet. In this case, the main device is adapted to play back the media content as it receives it from the Internet. In one embodiment, the media content is specific to the main device that will receive the media content and the reference identifier is also specific to the main device that will receive the streamed media content. The reference identifier is further generated as a function of an identification of the main device. In this case, two different main devices may receive different media contents. In another embodiment, the media content is independent from the main device that will receive the media content. In this case, different main devices receive the same media content, and the transmission method of the media content may be seen as broadcasting over the Internet.

In a further embodiment, the media content is broadcasted. In this case, a user is registered to a broadcast service and has access to media content broadcasted by the company offering the broadcast service. The media being broadcasted may be a video such as a movie, a television (TV) show, etc., or an audio signal such as a song, a concert recording, or the like. The company offering the broadcast service, i.e. the broadcaster, may be the creator of the media content being broadcasted. Alternatively, the creator of the media content may be an entity different from the broadcaster. For example, the creator of the media content may be a TV channel or a radio channel that uses the services of the broadcaster to broadcast the media content that it creates. It should be understood that a video comprises an audio track that corresponds to an audio signal, and therefore the audio track/audio signal is broadcasted.

In order to receive broadcasted content, a main device is authenticated, authorized, and/or registered. This is usually performed at the beginning of the user subscription to the broadcast service. In an example of a TV broadcasting service, the authorized main device may comprise a TV and a broadcast terminal. The broadcast terminal is then authenticated and permitted to receive the TV broadcast. The broadcast terminal then transmits the received video signal to the TV to be displayed thereon. When the user wishes to access the broadcast service, another service, content, and/or resources offered by the broadcasting company on a secondary and different device, the secondary device has to be authorized. Once authorized, the secondary device may receive the same broadcast as the one received by the main device, access content, and/or resources via a mobile application over a mobile telecommunication network or the Internet, etc.

Figure 1:
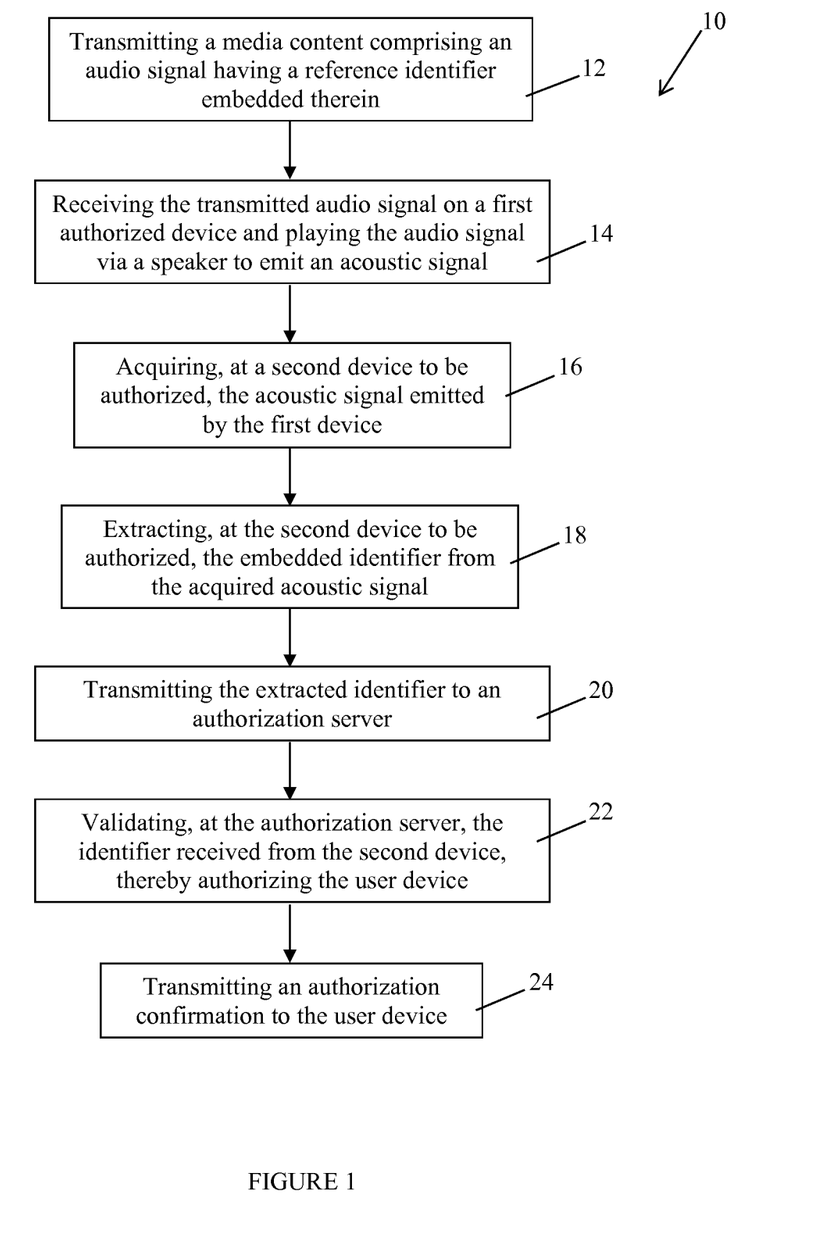
FIG. 1 is a flow chart illustrating a method of authorizing a user device, in accordance with an embodiment.

FIG. 1 illustrates one embodiment of a method 10 for authorizing a secondary device. A first or main device is already authenticated, authorized and/or registered, and is permitted to have access to a given media content. In one embodiment, the main device and the secondary device to be authorized may belong to a same user or entity. In another embodiment, the main device belongs to a first user or entity, and the secondary device belongs to a second and different user or entity.

At step 12, a given media content is transmitted and received by the main device that is already authorized to receive media content. The transmitted media content may be comprised in an analog signal. In this case, the media content may be transmitted using radio frequency telecommunications for example. In another example, the transmitted media content may be transmitted as a digital signal. In this case, the media content may be transmitted using fiber optics telecommunications for example. The media content comprises at least an audio signal in which a reference identifier is embedded. It should be understood that the reference identifier is embedded in the audio signal so that the identifier is not perceptible by a human being while listening to the audio signal or the acoustic signal corresponding to the audio signal. The media content may be a video comprising an audio track in which the identifier is embedded. The media content may also be an audio file or signal.

For example, the media content may be a broadcasted video comprising an audio track in which a reference identifier is embedded. The video is then received by a user broadcast terminal and displayed on a user TV that is connected to the broadcast terminal while the audio track of the video is played back by the user TV. In another example, the media content may be an audio signal such as the audio signal emitted by a radio station, and the main device may be an authorized, authenticated, and/or registered radio receiver. In this case, the radio receiver may be a car radio receiver for example. In another example, the radio receiver may be the same broadcast terminal as the one used for receiving TV broadcasted content, and the audio signal is played back by the TV that is connected to the broadcast terminal.

Figure 2:
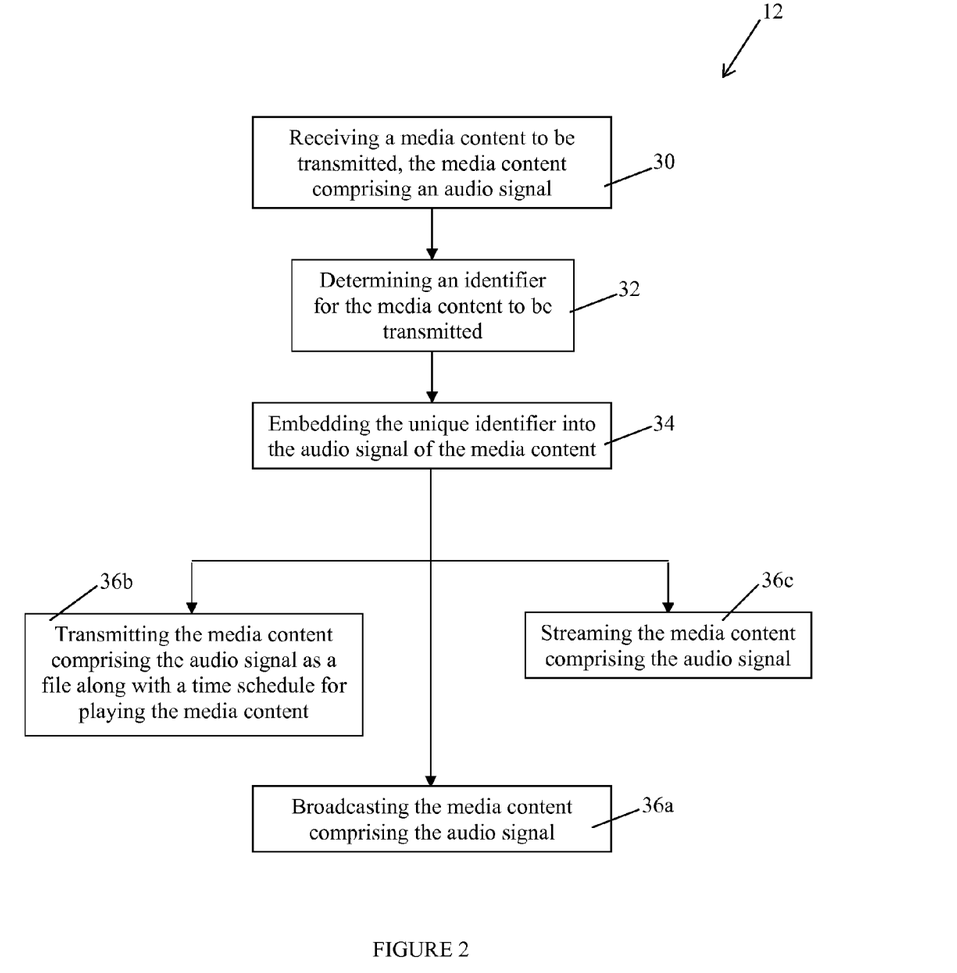
FIG. 2 is a flow chart illustrating a method of broadcasting a media content having a reference identifier embedded therein, in accordance with an embodiment.

FIG. 2 illustrates one embodiment of a computer-implemented method for transmitting a media content comprising an audio signal in which a reference identifier is embedded. At step 30, the media content to be transmitted is received on a server for example. The server may be the server of a broadcasting company, the server of a TV channel that uses the services of the broadcasting company to scatter its content, the server of a radio station that uses the services of the broadcasting company to scatter its content, the server of the media content company, or the like.

At step 32, a reference identifier is generated for the media content to be transmitted. In one embodiment, the server is adapted to generate a reference identifier for the media content to be transmitted and played back by the main device using any adequate method. In another embodiment, the server is adapted to retrieve a reference identifier from a database and embed the retrieved reference identifier into the media content to be transmitted. If the media content to be transmitted is a video, the reference identifier is embedded into the audio track of the video. If the media content to be transmitted is an audio signal, the identifier is directly embedded into the media content.

In one embodiment, the reference identifier to be embedded into a given media content is generated as a function of a scheduled playback time for the given media content, i.e. the time at which the given media content is scheduled to be played back by the main device. In an embodiment in which the given media content is to be streamed or broadcasted, the scheduled playback time may correspond to the time at which the given media is to be streamed or broadcasted, respectively, since the transmission of the given media by the server and the reception and playback of the given media by the main device may be seen as occurring substantially concurrently. In the case of streaming or broadcasting of the given media, the scheduled playback time may correspond to a given scheduled period of time of which the start point in time corresponds to the time at which the server starts streaming or broadcasting the given media content, and of which the end point in time corresponds to the time at which the server stops streaming or broadcasting the given media content. The reference identifier is then associated with the given scheduled period of time during which the given media content is to be streamed or broadcasted. It should be understood that the scheduled playback time may comprise the time and/or date at which the given media content is scheduled to be played back or transmitted. The scheduled playback time may be locally stored. For example, a local database may have stored thereon a scheduled playback time at which a respective media content is scheduled to be played back or transmitted, for each media content to be transmitted. Alternatively, the scheduled playback time may be received from another server such as a broadcasting server, or an external database. In this case, an identification of the media content is sent to the other server or the external database which returns the scheduled playback time at which the media content is scheduled to be played back or transmitted.

In one embodiment, a unique reference identifier is generated for each given media content as a function of the scheduled playback time at which the media content is to be played back or transmitted using any adequate identifier generation method known by the person skilled in the art. It should be understood that for each possible scheduled playback time at which a media content is to be played back or transmitted corresponds a unique reference identifier so that two different scheduled playback times may not share a same reference identifier. In another embodiment, the step of generating the reference identifier to be embedded may comprise a step of retrieving the reference identifier from a database. In this case, the database comprises a respective reference identifier for each scheduled playback time at which a respective media content is scheduled to be played back or transmitted so that two different scheduled playback times at which two different media contents or a same media content are/is to be played back or transmitted cannot share the same reference identifier.

In another embodiment, the reference identifier to be embedded into a given media content is generated as a function of the given media content to be transmitted by the main device. In one embodiment, the reference identifier is generated as a function of an identification of the media content to be played using any adequate identifier generation method known in the art. It should be understood that, in this case two, different media contents may not have the same reference identifier. In another embodiment, the reference identifier is retrieved from a database that comprises a respective and unique reference identifier for each possible media content to be transmitted and played back. The database may be stored locally or remotely. In this case, an identification of the given media content to be transmitted is inputted into the database that returns the corresponding and unique reference identifier for the given media content. It should be understood that, in this embodiment, a given media content will always have the same reference identifier independently of the time at which it is scheduled to be played back or transmitted.

In this embodiment, a same media content to be played back at different scheduled playback times is provided with a same reference identifier. For example, a given song to be broadcasted at a first time on a first date and the same given song to be broadcasted at a second and different time on a second and different date are provided with a same unique identifier. In this case, the value of the identifier to be embedded depends only on the media content to be played back by the main device, and is said to be media-dependent only. For a given media content, the value of the reference identifier to be embedded therein is constant independently of the time/date at which the content is to be played back by the main device.

In a further embodiment, the reference identifier to be embedded into a given media content is generated as a function of the given media to be transmitted to the main device and the scheduled playback time at which the given media is scheduled to be played back or transmitted. In one embodiment, the reference identifier is generated as a function of an identification of the media content to be transmitted to the main device and its corresponding scheduled playback time at which the given media content is to be played back or transmitted using any adequate identifier generation method known in the art. It should be understood that two different media contents may not have the same reference identifier. In another embodiment, the reference identifier is retrieved from a database that comprises a respective reference identifier for each possible media content to be transmitted to the main device and for each respective scheduled playback time at which a media content is scheduled to be played back or transmitted. The database may be stored locally or remotely. In this case, an identification of the given media content to be transmitted to the main device and its respective scheduled playback time are inputted into the database that returns the corresponding and unique reference identifier for the given media content and the given scheduled playback time at which the given media content is scheduled to be played back or transmitted.

In this embodiment, two identical media contents to be played back at different scheduled playback times are provided with different reference identifiers. For example, a given song to be broadcasted at a first time on a first day and the same given song to be provided at a second and different time and/or on a second and different day are provided with different reference identifiers. In this case, the value of the reference identifier to be embedded depends on both the media to be broadcasted and its respective scheduled playback time at which the media is to be played back or transmitted. In this case, a database may have stored thereon a unique identifier for each media content to be played back by the main device and for the respective scheduled playback time at which the media content is to be played back or transmitted. In one embodiment, the scheduled playback time may correspond to a period of time during which the media is to be streamed or broadcasted, as described above. The period of time may be defined by a starting time, i.e. the point in time at which the streaming/broadcasting of the given media content will start, and an end time, i.e. the point in time at which the streaming/broadcasting of the given media content will stop. In another example, the period of time may be defined by a start time and a time duration which corresponds to the duration of the given media content to be streamed/broadcasted.

In a further embodiment, the reference identifier may be generated as a function of an identification of the main device in addition to be dependent of the media content and/or the scheduled playback time at which the media content is scheduled to be played back or transmitted. In this case, a given media content to be played back by a first main device has a reference identifier that is different from the reference identifier assigned to the same media content to be played back by a second and different main device. The identification of the main device may be its Global Positioning System (GPS)

location, its Internet Protocol (IP) address, the name of the owner of the main device, a unique alpha-numerical identifier, or the like.

It should be understood that more than one reference identifier may be determined for a same media content to be played back at a given scheduled playback time. For example, a given media content may be divided into two or more portions to be played back successively in time. In this case, a respective reference identifier may be generated for each portion of the media to be played back by the main device.

At step 34, the reference identifier is embedded into the media content to be played back, i.e. in the audio signal contained in the media content to be played back by the main device. For example, the reference identifier may be embedded into the audio track of a video to be played back. In another example, the reference identifier may be embedded into a song to be played back. It should be understood that any adequate method for embedding an identifier into an audio signal or track may be used. It should be understood that the reference identifier is embedded into the audio signal/track such that the reference identifier is not perceptible by a human being while the human is listening to the audio signal/track or the acoustic signal corresponding to the audio signal.

In one embodiment, the reference identifier that is embedded into the audio signal is an audio watermark such as a spread spectrum audio watermark. In this case, any adequate method for generating an audio watermark and any adequate method for embedding an audio watermark into an audio signal may be used.

Once the reference identifier has been embedded in the media content to be played back, the media content to be played is transmitted to the main device In one embodiment, the media content comprising the embedded reference identifier is broadcasted at the scheduled playback time corresponding to the media content to be played back at step 36*a*, and subsequently received by the main device. The main device then plays back the media content as it is received. It should be understood that any adequate method for broadcasting a media content may be used. For example, amateur (ham) radio broadcasting, amateur television (ATV) broadcasting, closed-circuit TV broadcasting, public radio broadcasting, community radio broadcasting, commercial radio broadcasting, public television broadcasting, commercial television broadcasting, and/or the like may be used to broadcast the media content having the reference identifier embedded therein.

In another embodiment, the whole media content comprising the embedded reference identifier is transmitted at a discrete point in time at step 36*b*. For example, the media content may be sent as a computer file. In this case, the scheduled playback time at which the media content is scheduled to be played back by the main device is also transmitted to the main device. It should be understood that the scheduled playback time may be sent concurrently with the transmission of the media content. Alternatively, the scheduled playback time may be sent to the main device prior or after the transmission of the media content.

In a further embodiment, the media content comprising the embedded reference identifier is streamed over the Internet at step 36*c*. In this case, the main device plays back the media content as it receives it. It should be understood that any adequate method for streaming video and/or audio may be used.

Referring back to FIG. 1, the transmitted media content is received at step 14. The received media content comprises the audio signal having the reference identifier embedded therein. The audio signal is then played back by the main device. The main device is provided with an audio signal playing unit such as an electroacoustic transducer that converts the received audio signal into a corresponding acoustic signal. For example, the main device may comprise a TV provided with a speaker and a broadcast terminal connected to the TV. In this case, the broadcast terminal receives a broadcasted video, movie, TV show or the like which is transmitted to the TV. The TV then extracts the audio track of the received media content and plays the audio track. The speaker of the TV then converts the audio track into an acoustic signal that propagates in the area surrounding the speaker. In another example, the main device may be radio emitter that receives a broadcasted song emitted by a radio station, i.e. the broadcasted audio signal. A reference identifier is embedded in the broadcasted song. The radio receiver then plays the received audio signal, i.e. the received song, and a speaker of the audio receiver converts the audio signal into an acoustic signal that propagates in the area surrounding the speaker. It should be understood that the main device may be provided with any adequate speaker such as a loudspeaker, a headphone, an earphone, or the like. It should also be understood that since the audio signal comprises the reference identifier embedded therein the acoustic signal corresponding to the audio signal also comprises the reference identifier embedded therein.

In an embodiment in which the whole media content is transmitted at a discrete point in time such as in a computer file, the main device is adapted to play back the media content according to the received scheduled playback time. The media content is then stored until the scheduled playback time at which the media content is scheduled to be played back by the main device.

In an embodiment in which the media content is streamed or broadcasted, the main device is adapted to play back the media content as it is received such that the playback of the media content and the reception of the media content are performed substantially concurrently by the main device.

At step 16, the acoustic signal emitted by the main device is acquired by the secondary device to be authorized. The secondary device is provided with an acoustic-to-electric transducer such as a microphone adapted to acquire the acoustic signal corresponding to the audio signal and convert the acoustic signal into an audio signal. Since the acoustic signal comprises the identifier embedded therein, the acquired audio signal, i.e. the audio signal corresponding to the acoustic-to-electric conversion performed by the acoustic-to-electric transducer, also comprises the identifier embedded therein. The acquired audio signal is then stored locally on the secondary device such as in a cache memory.

At step 18, the secondary device extracts the identifier from the acquired audio signal using any adequate method. At step 20, the extracted identifier is sent by the secondary device to a server in charge of the authorization of the secondary device, i.e. the authorization server. It should be understood that the secondary device and the server may be connected together using any adequate communication means such as a wireless telecommunication network, the Internet, or the like in order to allow transmission of data between the secondary device and the server.

In one embodiment, the secondary device is further adapted to determine an acquisition time corresponding to the time at which the acoustic signal is acquired, and transmit the acquisition time to the authorization server along with the extracted identifier. In one embodiment, the acquisition time corresponds to the time at which the acoustic signal is actually acquired by the secondary device. In another embodiment, the acquisition time corresponds to the time at which the identifier is extracted from the sound signal by the secondary device. In a further embodiment, the acquisition time corresponds to the time at which the extracted identifier is sent to the authorization server.

In the same or another embodiment, the secondary device is further adapted to determine its local position using a GPS device for example, and to transmit the local position to the authorization.

After receiving the extracted identifier from the secondary device, the server validates the extracted identifier at step 22.

In an embodiment in which the media content is streamed or broadcasted and in which the reference identifier embedded into the given media content depends only on the given media content to be played back, the authorization server identifies an actual media content being presently streamed or broadcasted, respectively. The actual media content being presently streamed or broadcasted corresponds to the given media content that is being streamed or broadcasted concurrently with the reception of the extracted identifier or just after the reception of the extracted identifier. For example, the authorization server may send a request to the streaming/broadcasting server that returns the identification of the actual media content being presently streamed or broadcasted. The authorization server then retrieves the reference identifier that corresponds to the actual media being presently streamed or broadcasted, and compares the received and extracted identifier to the reference identifier associated with the actual media being presently streamed or broadcasted by accessing a database in which a reference identifier is stored for each media content to be streamed or broadcasted. If the received and extracted identifier corresponds to the reference identifier, then the authorization server determines a positive match between the two identifiers, and the secondary device is then positively authorized.

In an embodiment in which the media content is streamed or broadcasted and in which the reference identifiers depend only on the time at which their given media content is to be broadcasted, the authorization server retrieves the reference identifier that corresponds to an actual playback time for the received extracted identifier. In one embodiment, the actual playback time corresponds to the time of arrival of the extracted identifier, i.e. the time at which the authorization server receives the extracted identifier from the secondary device. In an embodiment in which the secondary device is adapted to transmit an acquisition time along with the extracted identifier to the authorization server, the actual playback time for the extracted identifier may correspond to the acquisition time received from the secondary device. Using the actual playback time associated with the received extracted identifier, the authorization server retrieves the reference identifier that corresponds to the actual playback time using the database that contains the scheduled playback times for the transmission of media contents and the respective reference identifier for each scheduled playback time, and compares the received extracted identifier to the reference identifier. If the received and extracted identifier corresponds to the reference identifier, then the authorization server determines a positive match between the two identifiers, and the secondary device is then positively authorized.

In an embodiment in which the media content is streamed or broadcasted and in which the reference identifiers depend on both the media content in which they are embedded and the scheduled playback time at which they are to be played back, streamed or broadcasted, the authorization server retrieves the reference identifier that corresponds to both the media content that is being streamed or broadcasted and the actual playback time for the received extracted identifier. As described above, the identification of the actual media content being presently streamed or broadcasted may be received from the streaming/broadcasting server, and the actual playback time may be received from the secondary device or locally determined as being the time of arrival of the extracted identifier. Using the actual playback time associated with the received extracted identifier and the identification of the actual media content being presently streamed or broadcasted, the authorization server retrieves the reference identifier that corresponds to the actual media content and for which the scheduled playback time substantially corresponds to the actual playback time, and compares the received extracted identifier to the reference identifier. If the received extracted identifier corresponds to the reference identifier, then the authorization server determines a positive match between the two identifiers, and the secondary device is then positively authorized.

In an embodiment in which the whole media content is sent at a discrete point in time such as in a computer file and played back by the secondary device at a time different from the time at which it is received by the secondary device according to a scheduled playback time, the authorization server receives the extracted identifier from the secondary device. The actual playback time may be locally determined by the authorization server. Alternatively, the authorization server may receive the acquisition time from the secondary device, and the actual playback time corresponds to the received acquisition time. The authorization server then retrieves the reference identifier of which the corresponding scheduled playback time corresponds to the received actual playback time using the database in which a corresponding reference identifier is stored for each possible scheduled playback time. The authorization server compares the received extracted identifier to the reference identifier retrieved from the database. If the received extracted identifier corresponds to the reference identifier, then the authorization server determines a positive match between the two identifiers, and the secondary device is then positively authorized.

In an embodiment in which the reference identifier further depends on the main device to which the media content is to be transmitted and the secondary device is adapted to further transmit its GPS location, the authorization server receives the extracted identifier and the GPS location of the secondary device from the secondary device. The authorization server may optionally receive the acquisition time from the secondary device. Alternatively, the authorization server may determine the actual playback time as being the time at which it receives the extracted identifier and the GPS location. The authorization server accesses a database in which reference identifiers and corresponding scheduled playback times and main device GPS location are stored for each reference identifier. The authorization server then identifies the reference identifier for which the scheduled playback time substantially corresponds to the actual playback time and for which the corresponding main device GPS location substantially corresponds to the received GPS location of the secondary device. The authorization server compares the received extracted identifier to the reference identifier retrieved from the database. If the received extracted identifier corresponds to the reference identifier, then the authorization server determines a positive match between the two identifiers, and the secondary device is then positively authorized.

Upon successful authorization of the secondary device, i.e. when the received extracted identifier corresponds to the retrieved reference identifier, the authorization server transmits a confirmation of authorization to the secondary device. The confirmation may have different forms.

In one embodiment, the confirmation is a confirmation message to be displayed on a display unit of the secondary device and indicating that the secondary device has been successfully authorized.

In another embodiment, the confirmation corresponds to the transmission of a media content as a video, an audio signal such as a song, an image, a text, or the like to the secondary device from the authorization server. The media content may also be received by the secondary device from the media content server.

In a further embodiment, the confirmation corresponds to an access to predefined resources that is provided to the secondary device. The access to the predefined resources may be permanent. Alternatively, the access to the predefined resources may be valid for a predetermined period of time.

In an embodiment in which a media content is broadcasted or streamed to the main device, the predefined resources may correspond to the broadcasted or streamed media content so that the secondary device may receive the same media content that is broadcasted or streamed to the main device.

In the same or another embodiment, the resources may be web content accessible via a web browser, an application, a mobile application, or the like. The resources may comprise images, videos, music, games, and/or the like that are accessible via a telecommunication network by the secondary device once authorized.

In one embodiment and upon successful validation of the secondary device, the authorization server generates a security code that permits the secondary device to access the predefined resources, and transmits the generated security code to the secondary device. The security code is also transmitted to the media content server. In another embodiment, the authorization server may retrieve the security code from a database, and transmit the retrieved security code to the authorized secondary device over the telecommunication network. In this case, the database containing the security code is also accessible by the media content server.

Upon receiving the security code, the secondary device stores the security code locally on a memory. The security code is then used by the secondary device to access the predefined resources. For example, the secondary device may be a mobile device such as a smartphone or a tablet. A mobile application may be stored on the secondary device and the mobile application may use the locally stored security code to access the predefined resources over a telecommunication network. The secondary device transmits the security code to a media content server in order access the predefined resources.

In one embodiment, a predetermined authorization period of time is associated with the security code so that the security code provides the secondary device with an access to the predefined resources only for the predetermined authorization period of time. When the predetermined authorization period of time has passed, the secondary device has no longer access to the predefined resources. For example, the security code may expire after a predefined period of time. In this case, the user may no longer have access the resources via the secondary device. If after the predefined period of time he wishes to have access to the predefined resources, the user has to repeat the method 10, i.e. acquiring a new acoustic signal emitted by his main device in order to extract an identifier therefrom and send the extracted identifier to the authorization server for validation in order to receive a new security code.

It should be understood that any adequate security code that allows the secondary device to access the predefined resources may be used. Examples of security codes comprise security tokens, decryption keys, session tokens, encrypted session tokens, cookies, or the like.

Figure 3:
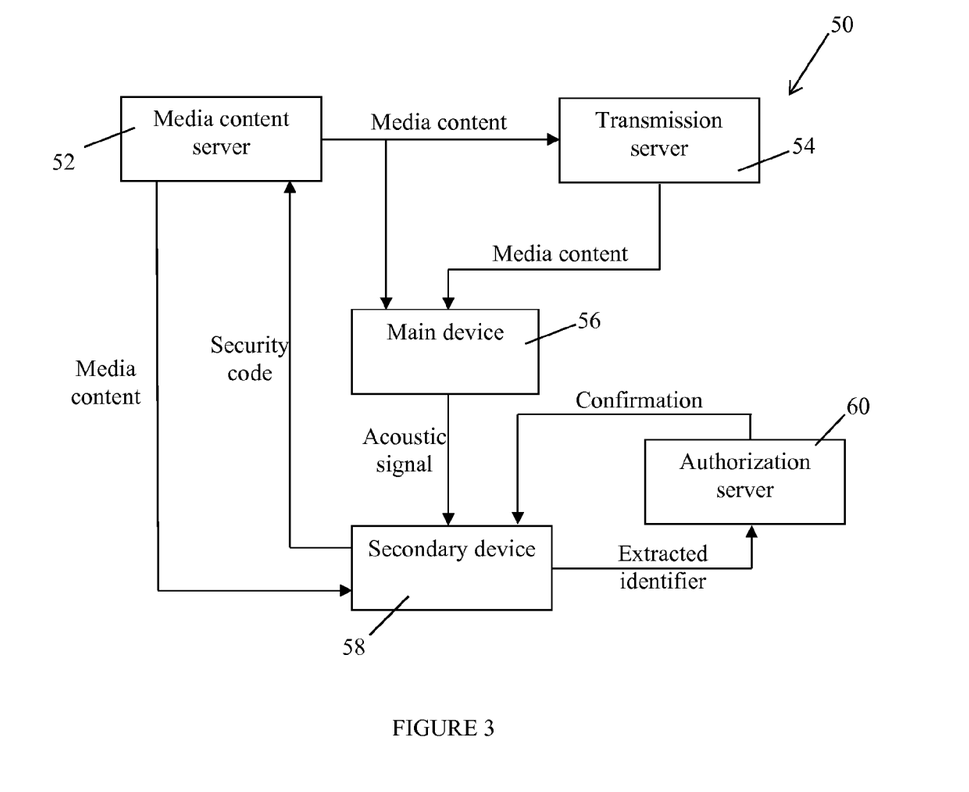
FIG. 3 is a block diagram illustrating a system for authorizing a user device, in accordance with an embodiment.

FIG. 3 illustrates one embodiment of a system 50 for authorizing a user device using an audio signal. The system 50 comprises a media content server 52, a transmission server 54, a main device 56, a secondary device 58 to be authorized, and an authorization server 60.

The media content server 52 comprises at least a processing unit or processor, a computer-readable memory, and a communication unit for transmitting and receiving data over a telecommunication network. The memory has statements and instructions stored thereon that when executed by the processing unit perform the steps of the above-described method for generating and embedding a reference identifier in a media content such as in the audio track of a video or an audio signal. As described above, the media content server 52 is adapted to receive a given media content to be transmitted and embed a reference identifier in the audio signal contained in the given media content. The reference identifier depends on the media content and/or the main device and/or the scheduled playback time at which the media content is scheduled to be played back by the main device 56. As described above, the scheduled playback time may correspond to the time at which the media content is transmitted when the media content is streamed or broadcasted.

In one embodiment, the media content server 52 is adapted to retrieve the reference identifier corresponding to the media content to be transmitted from a database using an identification of the media content to be transmitted and/or an identification of the main device and/or the scheduled playback time at which the media content is to be played back by the main device, as described above. It should be understood that the database containing the reference identifiers may be accessed by the authorization server 60.

In another embodiment, the media content server 52 is adapted to generate the reference identifier using an identification of the media content to be transmitted and/or an identification of the main device and/or the scheduled playback time at which the media content is to be played back, as described above. In one embodiment, the media content server 52 is adapted to retrieve the scheduled playback time at which the media content is to be played from a database in which all media contents to be transmitted and at least one respective scheduled playback time at which the media content is to be played back are stored.

In an embodiment in which it is adapted to generate the reference identifiers, the media content server 52 is adapted to store the generated reference identifiers in a database along with an identification of the media content and/or an identification of the main device 56 and/or a playback time at which the media content is scheduled to be played back by the main device 56, for each generated reference identifier. This database is then accessible by the authorization server 60.

In one embodiment, the media content server 52 is further adapted to transmit the media content having the reference identifier embedded therein directly to the main device 56 over a telecommunication network. The data representing the whole media content may be transmitted at a discrete point in time. In this case, the media content server may be transmitted as a computer file. The media content server also transmits the scheduled playback time associated with the media content to the main device 56 along with the media content. Alternatively, the media content server 52 may be adapted to stream the media content to the main device 56.

In another embodiment, the media content server 52 is adapted to transmit the media content to the transmission server 54. The transmission server 54 may be a broadcasting server or a streaming server. The transmission server 54 comprises at least a processing unit or processor, a computer-readable memory, and a communication unit. The memory has statements and instructions stored thereon that when executed by the processing unit or processor perform the steps of the above-described method for receiving the media content having the reference identifier embedded therein from the media content server 52 and broadcasting or streaming the media content. As described above, the transmitted signal may be an analog signal or a digital signal. It should be understood that any adequate method for broadcasting or streaming media content comprising an audio signal/track in which a reference identifier is embedded any be used. For example, radio frequencies may be used for broadcasting the media content. In another example, a fiber optic telecommunication network may be used for broadcasting or streaming the media content.

The main device 56 receives the media content that has been transmitted by the media content server 52 or the transmission server 54. The main device 56 comprises a processor or processing unit, a telecommunication unit for receiving the transmitted media content from the media content server 52 or the transmission server 54, and an electric-to-acoustic transducer for converting a received electrical signal into an acoustic signal. The main device 56 is already authenticated, authorized, and/or registered so as to be permitted to receive the content transmitted by the media content server 52 or the transmission server 54. The electric-to-acoustic transducer may be any adequate device or apparatus adapted to convert an electric audio signal into a corresponding acoustic signal. Examples of electric-to-acoustic transducers comprise a loudspeaker, a headphone, an earphone, or the like.

In an embodiment in which the whole media content is received by the main device 56 as a discrete point in time, i.e. the whole media content is received as a file at a given point in time, along with the scheduled playback time associated with the media content, the main device 56 is adapted to store locally the received media content and corresponding scheduled playback time. The main device 56 is further adapted to play back the media content at the time/date indicated by the received scheduled playback time.

In an embodiment in which the media content is streamed or broadcasted over time, the main device 56 plays back the audio signal contained in the streamed or broadcasted media content upon reception of the media content. In one embodiment, the playback of the audio signal occurs in substantially real-time, i.e. the main device 56 plays back the audio signal as soon as it receives the streamed/broadcasted media content, and the playback of the audio signal and the reception of the media content occurs substantially concurrently. In an embodiment in which the streamed/broadcasted media content contains an audio signal, the electric-to-acoustic transducer of the main device 56 converts the broadcasted audio signal into an acoustic signal. In an embodiment in which the streamed/broadcasted media content contains a video, the main device 56 first extracts the audio track of the video to obtain an audio signal, and the electric-to-acoustic transducer of the main device 56 converts the extracted audio signal into an acoustic signal.

In one embodiment, the telecommunication unit of the main device 56 comprises a modem adapted to receive data via a telephone circuit, a broadband over coaxial cable, a fiber optic or copper wires, a Wi-Fi network, a satellite telecommunication link, a cellular telecommunication network, and/or the like.

In another embodiment, the telecommunication unit of the main device 56 comprises an antenna adapted to receive broadcasted content transmitted over radio frequencies.

It should be understood that the main device 56 may comprise more than one modules or units. For example, the main device 56 may comprise a TV and a terminal. The terminal is adapted to receive the streamed/broadcasted content from the media content server 52 or the transmission server 54 and transmit it to the TV. The TV is provided with a display for displaying images of a broadcasted video for example, and an electric-to-acoustic transducer for playing back the audio track of the broadcasted video.

Examples of main devices comprise a TV associated with a terminal, a desktop personal computer connectable to a communication network, a laptop connectable to a communication network, a tablet connectable to a communication network, a smartphone connectable to a communication network, etc.

Referring back to FIG. 3, the secondary device to be authorized 58 comprises a processor or processing unit, a memory, a telecommunication unit for receiving and transmitting data over a telecommunication network, and an acoustic-to-electric transducer such as a microphone for acquiring and converting the acoustic signal emitted by the main device 56 into an electric audio signal. The memory of the secondary device 58 has statements and/or instructions stored therein that when executed by its processing unit perform the steps of the above-described method for acquiring the acoustic signal to obtain an acquired audio signal, extract the identifier embedded in the acquired audio signal, and transmit the extracted identifier to the authorization server 60 over a telecommunication network, as described above.

In one embodiment, the secondary device 56 is further adapted to determine and transmit an acquisition time to the authorization server 60. As described above, the acquisition time may be the time at which the acoustic signal is acquired, the time at which the identifier is extracted from the acquired audio signal, the time at which the extracted identifier is sent to the authorization server 60, or the like.

In the same or another embodiment, the secondary device 56 further comprises a GPS device and is further adapted to transmit its GPS location along with the extracted identifier and optionally the acquisition time.

Examples of secondary device comprise a desktop personal computer connectable to a communication network, a laptop connectable to a communication network, a tablet connectable to a communication network, a smartphone connectable to a communication network, etc.

Referring back to FIG. 3, the authorization server 60 is connected to the secondary device 58 over a telecommunication network and comprises at least a processing unit or processor, a computer-readable memory, and a communication unit. The memory has statements and/or instructions stored thereon that when executed by the processing unit perform the steps of the above-described method for receiving and validating the extracted identifier, and transmitting an authorization confirmation to the secondary device 58 upon successful validation of the extracted identifier.

In an embodiment in which the reference identifier depends only on the media content to be streamed/broadcasted, the authorization server 60 is adapted to determine the actual media content being presently streamed/broadcasted concurrently with the validation of the received extracted identifier. As described above, the authorization server 60 is further adapted to retrieve the reference identifier that corresponds to the actual media being presently streamed/broadcasted from the database, and compares the received and extracted identifier to the reference identifier. If the received and extracted identifier corresponds to the reference identifier, then the authorization server 60 determines a positive match between the two identifiers, and the secondary device 58 is then positively authorized.

In one embodiment, upon unsuccessful validation of the extracted identifier, the authorization server 60 is further adapted to compare the extracted identifier for a given media content to the identifier of the media content that is scheduled to be played back by the main device 56 just after the given media content, and/or to the identifier of the media content that is scheduled to be played back by the main device 56 just before the given media content. In this case, the authorization server 60 is adapted to transmit a request to the media content server 52 or the transmission server 54 to receive an identification of the further media content, i.e. the media content to be played back just after and/or just prior to the given media content. Upon reception of the identification of the further media content, the authorization server 60 is adapted to retrieve the reference identifier that corresponds to the further media content and compare it to the extracted identifier. Upon successful comparison between the extracted identifier and the identifier of the further media content, the authorization server 60 then positively authenticates the secondary device 58. In this case, the system allows for a flexible identification that takes into account possible time delay between the actual streaming/broadcasting of a media content and the scheduled playback time at which the media content was supposed to be played back. It may also take into account possible delay in time due to the transmission, acquisition, and/or processing of data that may occur along the process.

In an embodiment in which the reference identifier depends only on the scheduled playback time at which its respective media content is to be played back, the authorization server 60 is adapted to determine an actual playback time associated with the received extracted identifier and retrieve the reference identifier that corresponds to the actual playback time from the database that contains the reference identifiers and their respective playback time. The retrieved identifier corresponds to the reference identifier for which the corresponding scheduled playback time corresponds to the actual playback time. As described above, the actual playback time may correspond to the time at which the extracted identifier is received by the authorization server 60 or the above-described acquisition time. The authorization server 60 is adapted to compare the received extracted identifier to the compares the received extracted identifier to the retrieved reference identifier. If the received and extracted identifier corresponds to the reference identifier, then the authorization server 60 determines a positive match between the two identifiers, and the secondary device 58 is then positively authorized.

In one embodiment, upon unsuccessful validation of the extracted identifier, the authorization server 60 is further adapted to compare the extracted identifier for a given media content to be played back at a given time to the identifier corresponding to the next or previous time schedule. In this case, the database comprises different scheduled playback times for different media contents, and a respective reference identifier for each scheduled playback time. The authorization server 60 is adapted to retrieve from the database the further identifier that correspond to a further scheduled playback time, i.e. the next scheduled playback time or the previous scheduled playback time relative to the scheduled playback time associated with the given media content is to be played back. The authorization server 60 is then adapted to compare the extracted identifier to the reference identifier associated with the further scheduled playback time. Upon successful comparison, the authorization server 60 then positively authenticates the secondary device 58.

In an embodiment in which the reference identifier is generated as a function of an identification of the main device 56, the authorization server 60 further receives the GPS location of the secondary device 58 along with the extracted identifier and optionally the acquisition time. The authorization server 60 is further adapted to retrieve the identification of the main device that corresponds to the received GPS location. Using the retrieved identification of the main device and optionally the actual playback time, the authorization server 60 retrieves the corresponding reference identifier, and compares the received identifier to the reference identifier. If the received and extracted identifier corresponds to the reference identifier, then the authorization server 60 determines a positive match between the two identifiers, and the secondary device 58 is then positively authorized.

In one embodiment, the generation of a reference identifier as a function of the location of the main device allows for determining from which main device a given extracted identifier is received.

Upon successful authorization of the secondary device 58, the authorization server 60 is adapted to transmit a confirmation of authorization to the secondary device 58. As described above, the authorization confirmation may have different forms. The memory of the authorization server 60 further comprises statements and/or instructions that when executed by the processor of the authorization server 60 performs the steps of the above-described method of transmitting a confirmation of authorization to the secondary device 58. For example, the memory of the authorization further comprises statements and/or instructions that when executed by the processor of the authorization server 60 performs the steps of determining and sending a security code to the secondary device 58 over the telecommunication network. In one embodiment, the authorization server 60 is adapted to retrieve a previously generated security code from a database. In another embodiment, the authorization server 60 is adapted to generate the security code. In this case, the generated security code is transmitted to the media content server 52 or stored in a database that is accessible by the media content server 52.

In one embodiment, the authorization server 52 is adapted to transmit a confirmation message to be displayed on a display unit of the secondary device 58 and indicating that the secondary device 58 has been successfully authorized.

In another embodiment, the confirmation corresponds to the transmission of a media content as a video, an audio signal such as a song, an image, a text, or the like to the secondary device from the authorization server. The media content is sent to the secondary device 58 from the authorization server 60 or the media content server 52.

In an embodiment in which it receives a security code from the authorization server 60, the secondary device 58 stores it locally on its memory. The security code is then used by the secondary device 58 to access the predefined resources. The predefined resources may be stored on the media content server 52 for example. In this case, the secondary device 58 transmits the security code to the media content server 52 that validates the security code to provide the secondary device 58 with an access to the predefined resources.

In one embodiment, the reference identifier is embedded substantially continuously through the entire audio signal. For example, the reference identifier may be repeated substantially continuously within the media content in which it is embedded.

In another embodiment, the reference identifier is embedded within the audio signal at different and distinct points in time or locations separated by portions of the audio signal in which the reference identifier is not embedded. In this case, the secondary device 58 is adapted to acquire the acoustic signal during a period of time that is sufficiently long to ensure that the reference identifier will be present in the acquired portion of the acoustic signal.

In one embodiment, more than one reference identifier may be associated with a same media content. For example, a given media content having a given time duration may be divided in time into a first portion having a first time duration, and a second portion having a second time so that the sum of the first and second time durations correspond to the given duration of the given media content. In this case, a first reference identifier may be associated and embedded into the first portion of the given media content while a second and different reference identifier may be associated and embedded into the second portion of the given media content. The above-described method for authorizing a user device applies. When the first portion of the given media content is played back by the main device, the secondary device acquires the first portion and extracts the first identifier. The first extracted identifier is then transmitted to the authorization server. When the second portion of the given media content is played back by the main device, the secondary device acquires the second portion of the given media content and extracts the second identifier. The second extracted identifier is then transmitted by the secondary device to the authorization server.

The authorization server accesses a database in which a respective reference identifier and a respective scheduled playback time are stored for each media content portion. The authorization server retrieves the reference identifier that corresponds the actual playback time for the portion of the given media content, and compares the reference identifier to the received identifier, as described above. Upon successful match between the reference identifier and the received identifier, the authorization server transmits a confirmation of authorization to the secondary device.

While in the above example the given media content is divided into two portions, the person skilled in the art will understand that the given media content may be divided into more than two portions. The time durations of the different media content portions may be substantially identical. Alternatively, the time duration of a media content potion may vary from one portion to another.

The embodiments of the invention described above are intended to be exemplary only. The scope of the invention is therefore intended to be limited solely by the scope of the appended claims.

We claim:

1. A computer-implemented method for authorizing a user device, comprising:
   use of a processor for receiving an extracted identifier transmitted by a secondary device to be authorized over a telecommunication network, the extracted identifier being previously extracted by the secondary device to be authorized from an acoustic signal generated by an authorized main device, the acoustic signal corresponding to a transmitted audio signal received by the authorized main device and having a reference identifier embedded therein;
   use of the processor for validating the received identifier; and
   upon successful validation, use of the processor for transmitting an authorization confirmation to the secondary device, thereby authorizing the secondary device to access media content.

2. The computer-implemented method of claim 1, wherein the reference identifier is generated as a function of a scheduled playback time associated with the audio signal, the scheduled playback time corresponding to a given time at which the audio signal is scheduled to be one of:
   played back by the authorized main device; and
   transmitted to the main device.

3. The computer-implemented method of claim 1, wherein the reference identifier is generated as a function an identification of a media content that contains the audio signal.

4. The computer-implemented method of claim 2, wherein the reference identifier is further generated as a function of an identification of the authorized main device.

5. The computer-implemented method of claim 1, wherein the reference identifier comprises an audio watermark.

6. The computer-implemented method of claim 1, wherein the audio signal is one of streamed and broadcasted, the authorized main device for playing back the audio signal as the authorized main device receives the audio signal.

7. The computer-implemented method of claim 1, wherein the audio signal is transmitted to the authorized main device as a whole at a discrete point in time, the authorized main device being adapted to further receive a scheduled playback time indicating a time at which the audio signal is scheduled to be played back by the authorized main device.

8. The computer-implemented method of claim 1, wherein said validating comprises:
   determining an actual playback time for the audio signal;
   retrieving a given reference identifier for which a scheduled playback time substantially corresponds to the actual playback time; and
   comparing the extracted identifier to the given reference identifier, a positive match between the extracted identifier and the given reference identifier corresponding to a successful validation.

9. The computer-implemented method of claim 8, wherein the actual playback time substantially corresponds to one of:
   a first time at which the extracted identifier is received;
   a second time at which the extracted identifier is extracted by the secondary device; and
   a third time at which the extracted identifier is transmitted by the secondary device.

10. The computer-implemented method of claim 1, wherein said validating comprises:
    determining a first identification of an actual audio signal being actually streamed or broadcasted;
    determining a second identification of the audio signal corresponding to the extracted identifier; and
    comparing the first and second identification, a positive match corresponding to a successful validation.

11. The computer-implemented method of claim 1, wherein the audio signal corresponds to an audio track of a video.

12. The computer-implemented method of claim 1, wherein the authorization message comprises a security code to be used to access resources.

13. An apparatus for authorizing a user device, the apparatus comprising a processing unit, a communication unit, and a memory having stored thereon instructions that when executed by the processing unit performs the steps of the method of claim 1.

14. A computer-implemented method for a user device to request for an authorization, comprising:
- use of a processor for acquiring an acoustic signal having a reference identifier embedded therein, thereby obtaining an acquired audio signal having the reference identifier embedded therein, the acoustic signal being generated by an authorized device, the acoustic signal corresponding to a transmitted audio signal received by the authorized device and having the identifier embedded therein;
- use of the processor for extracting the reference identifier from the acquired audio signal, thereby obtaining an extracted identifier;
- use of the processor for transmitting the extracted identifier to an authorization server over a telecommunication network; and
- use of the processor for receiving from the authorization server an authorization confirmation upon successful validation of the extracted identifier from the authorization server.

15. The computer-implemented method of claim 14, wherein the reference identifier is generated as a function of a scheduled playback time associated with the audio signal, the scheduled playback time corresponding to a given time at which the audio signal is scheduled to be one of:
- played back by the authorized main device; and
- transmitted to the main device.

16. The computer-implemented method of claim 14, wherein the reference identifier is generated as a function an identification of a media content that contains the audio signal.

17. The computer-implemented method of claim 15, wherein the reference identifier is further generated as a function of an identification of the authorized main device.

18. The computer-implemented method of claim 14, wherein the reference identifier comprises an audio watermark.

19. The computer-implemented method of claim 14, wherein the audio signal is one of streamed and broadcasted, the authorized main device for playing back the audio signal as the authorized main device receives the audio signal.

20. The computer-implemented method of claim 14, wherein the audio signal is transmitted to the authorized main device as a whole at a discrete point in time, the authorized main device being adapted to further receive a scheduled playback time indicating a time at which the audio signal is scheduled to be played back by the authorized main device.

21. The computer-implemented method of claim 14, wherein said validation comprises:
- determining an actual playback time for the audio signal;
- retrieving a given reference identifier for which a scheduled playback time substantially corresponds to the actual playback time; and
- comparing the extracted identifier to the given reference identifier, a positive match between the extracted identifier and the given reference identifier corresponding to a successful validation.

22. The computer-implemented method of claim 21, wherein the actual playback time substantially corresponds to one of:
- a first time at which the extracted identifier is received;
- a second time at which the extracted identifier is extracted by the secondary device; and
- a third time at which the extracted identifier is transmitted by the secondary device.

23. The computer-implemented method of claim 14, wherein said validating comprises:
- determining a first identification of an actual audio signal being actually streamed or broadcasted;
- determining a second identification of the audio signal corresponding to the extracted identifier; and
- comparing the first and second identification, a positive match corresponding to a successful validation.

24. The computer-implemented method of claim 14, wherein the audio signal corresponds to an audio track of a video.

25. The computer-implemented method of claim 14, wherein the authorization message comprises a security code to be used to access resources.

26. An apparatus to be authorized, the apparatus comprising a processing unit, a communication unit, and a memory having stored thereon instructions that when executed by the processing unit performs the steps of the method of claim 14.

* * * * *